US010608432B2

(12) United States Patent
Neal

(10) Patent No.: US 10,608,432 B2
(45) Date of Patent: Mar. 31, 2020

(54) APPLIANCE POWER MANAGEMENT SYSTEM

(71) Applicant: Midea Group Co., Ltd., Beijiao, Shunde, Foshan (CN)

(72) Inventor: Vern A. Neal, Louisville, KY (US)

(73) Assignee: MIDEA GROUP CO., LTD., Beijiao, Shunde, Foshan, Guangdong (CN)

(*) Notice: Subject to any disclaimer, the term of this patent is extended or adjusted under 35 U.S.C. 154(b) by 14 days.

(21) Appl. No.: 15/941,914

(22) Filed: Mar. 30, 2018

(65) Prior Publication Data
US 2019/0305553 A1 Oct. 3, 2019

(51) Int. Cl.
H02J 3/14 (2006.01)
G05B 19/02 (2006.01)

(52) U.S. Cl.
CPC ............ H02J 3/14 (2013.01); G05B 19/02 (2013.01); G05B 2219/2639 (2013.01); H02J 2310/14 (2020.01)

(58) Field of Classification Search
CPC ........... H01M 2/004; H02J 1/14; H02J 7/0031
See application file for complete search history.

(56) References Cited

U.S. PATENT DOCUMENTS

| 6,891,478 | B2 | 5/2005 | Gardner |
| 7,561,977 | B2 | 7/2009 | Horst et al. |
| 7,606,639 | B2 | 10/2009 | Miyaji |
| 8,131,403 | B2 | 3/2012 | Forbes et al. |
| 8,172,042 | B2 * | 5/2012 | Wesson ................ B66B 1/308 187/290 |
| 8,200,370 | B2 * | 6/2012 | Paik ........................ H02J 3/14 700/12 |
| 8,433,452 | B2 | 4/2013 | Fleck et al. |
| 8,626,348 | B2 | 1/2014 | Owens et al. |
| 8,954,200 | B2 | 2/2015 | Jang et al. |
| 2008/0238710 | A1 | 10/2008 | Tolnar et al. |
| 2009/0292403 | A1 * | 11/2009 | Howell ................ G01R 22/10 700/292 |

(Continued)

FOREIGN PATENT DOCUMENTS

| CN | 102483643 A | 5/2012 |
| CN | 106797125 A | 5/2017 |

(Continued)

OTHER PUBLICATIONS

Rasheed, et al. "Energy Optimization in Smart Homes Using Customer Preference and Dynamic Pricing" www.dialog.proquest.com. 2016.

(Continued)

Primary Examiner — Kidest Bahta
(74) Attorney, Agent, or Firm — Middleton Reutlinger

(57) ABSTRACT

The specification discloses methods and systems managing the power provided to the components of an appliance by providing a processor and concomitant data memory and a data table stored in memory listing a nominal power consumption for each of a plurality of electrical components of the appliance. The processor is configured to monitor the components to determine which components are being energized based upon the status of their respective inputs and outputs; and adjust the power provided to at least one of said components based upon a predetermined criteria.

14 Claims, 3 Drawing Sheets

(56) References Cited

U.S. PATENT DOCUMENTS

| | | | |
|---|---|---|---|
| 2011/0087382 A1 | 4/2011 | Santacatterina et al. | |
| 2012/0080940 A1* | 4/2012 | Larsen | H02J 1/14 307/12 |
| 2012/0181942 A1* | 7/2012 | Redjebian | H05B 41/28 315/210 |
| 2013/0024041 A1 | 1/2013 | Golden et al. | |
| 2013/0144451 A1 | 6/2013 | Kumar et al. | |
| 2016/0036227 A1* | 2/2016 | Schultz | H02J 3/005 700/282 |
| 2016/0218509 A1 | 7/2016 | Paul et al. | |

FOREIGN PATENT DOCUMENTS

| | | |
|---|---|---|
| CN | 107534284 A | 1/2018 |
| CN | 107732908 A | 2/2018 |
| EP | 0456872 A1 | 11/1991 |

OTHER PUBLICATIONS

Pipattanasomporn, et al. "An Algorithm for Intelligent Home Energy Management and Demand Response Analysis" IEEE Transactions on Smart Grid. 2012.
Chang "Load Identification of Non-intrusive Load-monitoring System in Smart Home" WSEAS Transactions on Systems. May 2010.
International Search Report and Written Opinion of PCT Ser. No. PCT/CN2018/123709, dated Mar. 27, 2019.

* cited by examiner

| COMPONENT | LOAD (A) | PULSE-WIDTH MODULATION | VOLTAGE SCALING | CRITICAL | CYCLE | MAX LOAD TOTAL (A) |
|---|---|---|---|---|---|---|
| L1 | 10 | Y | N | N | Y | 40 |
| L3 | 10 | Y | N | N | Y | |
| L4 | 10 | Y | Y | N | Y | |
| L5 | 10 | Y | Y | N | Y | |
| L6 | 10 | Y | Y | N | Y | |
| LN | 10 | Y | Y | Y | Y | |

FIG. 3

APPLIANCE POWER MANAGEMENT SYSTEM

BACKGROUND

In electrical manufacturing industries generally, and specifically in the appliance manufacturing industries, the National Electric Code permits circuits used to operate appliances to be rated for power consumption (or maximum current consumption) that is significantly less than the sum total of all the power loads that may be energized or actuated in an individual appliance. The reasoning behind this standard is that in normal operation not all of the available appliance electrical components can or will be operated simultaneously. Typically, even during a heavy power usage condition where a plurality of loads are simultaneously drawing current, the circuit breaker current trip curve permits the electrical loads connected thereto to exceed the breaker rating for very short time periods. Accordingly, many new appliances are presently designed such that their electrical components, if energized simultaneously, will far exceed the circuit breaker ratings for the circuits supplying them with electrical power.

The overall design trend as appliances become more sophisticated is for most devices to be designed with more electrical components, thus increasing the number of electrical loads that may be drawing current at any time in any one appliance. This tendency makes it more common for appliances to trip circuit breakers during what many would consider "normal" operation of a specific appliance. In order to avoid and minimize circuit breaker trips many manufacturers have designed power sharing or power management systems into their appliances.

Prior art appliance power management systems vary widely in design but often come in two categories. Many hardwired power management systems utilize current transformers or equivalent sensors to determine current demand, and then utilize hard-wired automatic switching circuits employing relays to reduce or cut-off power to some electrical components that are considered non-critical. Other power management systems utilize various processors and feedback control loops to monitor and adjust power usage based on direct feedback and prioritized load usage. Additionally some systems combine these two general techniques to achieve efficient power management.

There are various disadvantages to each of these approaches to power management. Hardwired systems typically employ a great deal of complex circuitry and usually require a good deal of additional hardware to implement. These systems can be quite expensive to design and build, and once implemented they do not have the ability to intelligently adjust power consumption based on changing variables. Processor and feedback control power management systems offer a greater degree of control and flexibility but also require a large number of additional sensors and hardware that necessarily add cost and complexity to the appliance design.

From the foregoing it can readily be seen that there is a need in the art for a power management system that can be employed with individual appliances to control overall power usage in the appliance without adding significantly to the cost and complexity of the devices.

SUMMARY

The present disclosure is related to systems and methods for managing current and/or electrical power consumption in an appliance. The system described herein utilizes a controller and/or processor either integral to or separate from the appliance to monitor requested power loads of all components associated with the appliance. The requested power loads are added to a resultant total power load and then compared to a maximum allowable load, either as defined by the appliance manufacturer or the circuit rating for the appliance.

In various embodiments, the methods disclosed herein provide a system that reduces or modifies the current and/or power supplied to various appliance components based upon a plurality of component electrical power consumption characteristics. In some aspects these characteristics for each appliance component are stored in a data chart or look-up table that is readily accessed by a processor. In some aspects and embodiments exemplary but non-limiting characteristics may include the current or power load required by each component, whether that component may be operated utilizing pulse-width modulated power, whether that component may be operated utilizing scaled voltage, whether that component may be operated utilizing cycled power, and whether that component is critical to the overall operation of the appliance and thus may not be operated in a reduced power scenario.

In other embodiments, the system and methods disclosed herein may be used to cycle power to a plurality of components where the requested total load exceeds the maximum allowed load. Additionally and alternatively the system and methods disclosed herein may be used to provide scaled voltage power to a plurality of components where the requested total load exceeds the maximum allowed load. Additionally and alternatively the system and methods disclosed herein may be used to provide pulse-width modulated power to a plurality of components where the requested total load exceeds the maximum allowed load.

In other aspects of the disclosure the controller may be provided with data in a look-up table listing a component or components of an appliance as a critical component, wherein the processor or controller will not permit that component to operate with a reduced current or power consumption in the event of a potential high power load.

As used herein for purposes of the present disclosure, the term "appliance" should be understood to be generally synonymous with and include any device that consumes electrical power and can be connected to an electrical circuit, for example one used in a residential or commercial setting to accomplish work. The appliances referred to herein may include a plurality of electrically operated components powered by the circuit and further may include a processor or processors that operate the appliance.

The term "controller" or "processor" is used herein generally to describe various apparatus relating to the operation of the system and the appliances referred to herein. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), programmable logic controllers (PLCs), and field-programmable gate arrays (FPGAs).

A processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "Internet" or synonymously "Internet of things" refers to the global computer network providing a variety of information and communication facilities, consisting of interconnected networks using standardized communication protocols. The appliances, controllers and processors referred to herein may be operatively connected to the Internet.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. The drawings are not necessarily to scale. Emphasis is instead generally placed upon illustrating the principles of the disclosure, wherein;

FIG. 3 is an exemplary look-up table for component loads in accordance with some aspects and embodiments.

DETAILED DESCRIPTION

Figure 1:
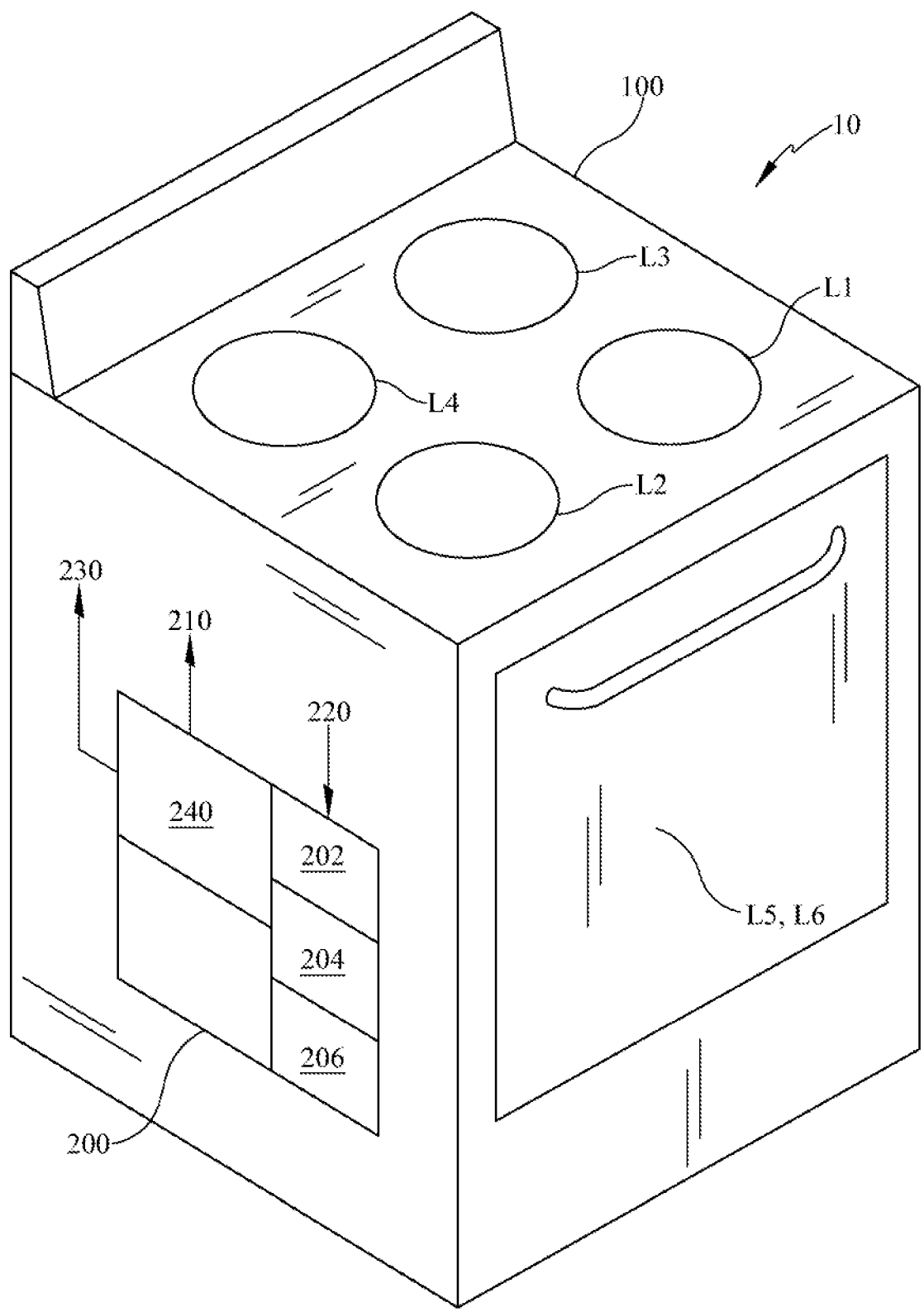
FIG. 1 is an isometric diagram of an appliance in accordance with various embodiments.
Figure 2:
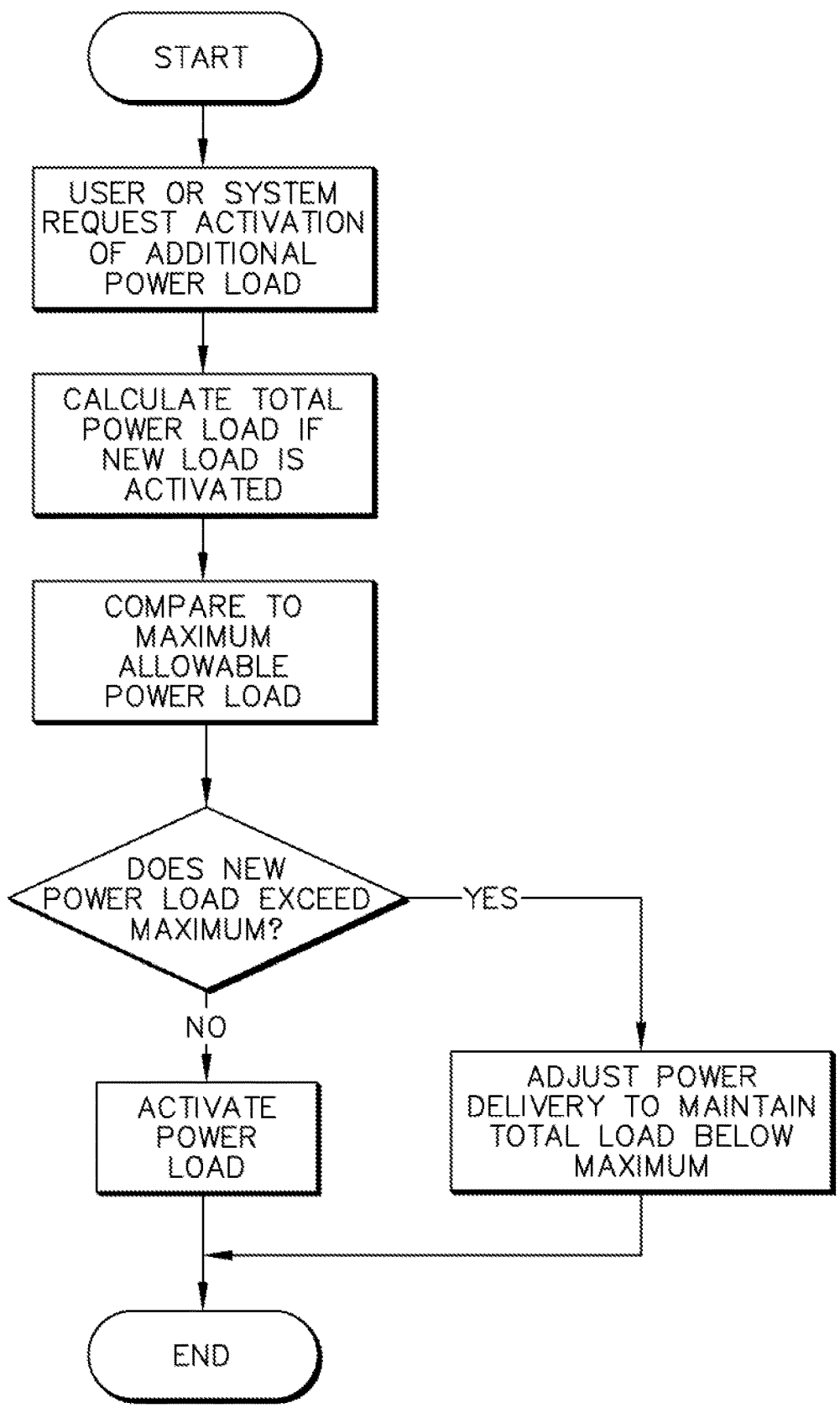
FIG. 2 is a block diagram of an exemplary system of operation in accordance with various embodiments.

Referring to drawing FIGS. 1 and 2, and in accordance with various aspects and embodiments of the invention, a system 10 for managing the electrical power consumption of an appliance 100 is described. In various embodiments the appliance 100 in which system 10 is implemented may include a controller 200 integral to appliance 100 that operates appliance 100 and implements power management system 10.

FIG. 1 illustrates an exemplary appliance 100 hardware environment for implementing system 10 for power management. The appliance 100 may include a controller 200, a processor or processors 202 and memory 204. Appliance 100 may further comprise a plurality of signal outputs 210 and signal inputs 220 that may be operatively connected to a plurality of appliance 100 components to monitor and direct system 10 operation. Furthermore, in some embodiments controller 200 may include a wireless or hard-wired communications interface 230 that enables controller 200 to communicate with external devices or communications networks such as the internet, that may be integrated into system 10.

Additionally, controller 200 may be equipped with an operator interface 240 to provide audible or visual feedback to a user as well as provide a user the ability to provide instructions or commands to controller 200. Exemplary but non-limiting user interfaces that may be employed include a mouse, keypads, touch-screens, keyboards, switches and/or touch pads. Any user interface may be employed for use in the invention without departing from the scope thereof. It will be understood that FIG. 1 constitutes, in some respects, an abstraction and that the actual organization of the components of appliance 100 and controller 200 may be more complex than illustrated.

The processor 202 may be any hardware device capable of executing instructions stored in memory 204 or data storage 206 or otherwise processing data. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 204 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the communication interface 230.

The communication interface 230 may include one or more devices for enabling communication with other hardware devices. For example, the communication interface 230 may include a network interface card (NIC) configured to communicate according to the Ethernet protocol. Additionally, the communication interface 230 may implement a TCP/IP stack for communication according to the TCP/IP protocols. Various alternative or additional hardware or configurations for the communication interface 230 will be apparent.

The storage 206 may include one or more machine-readable storage media such as read-only memory (ROM), random-access memory (RAM), magnetic disk storage media, optical storage media, flash-memory devices, or similar storage media. In various embodiments, the storage 206 may store instructions for execution by the processor 202 or data upon with the processor 202 may operate. For example, the storage 206 may store a base operating system for controlling various basic operations of the hardware. Other instruction sets may also be stored in storage 206 for executing various functions of system 10, in accordance with the embodiments detailed below.

It will be apparent that various information described as stored in the storage 206 may be additionally or alternatively stored in the memory 204. In this respect, the memory 204 may also be considered to constitute a "storage device" and the storage 206 may be considered a "memory." Various other arrangements will be apparent. Further, the memory 204 and storage 206 may both be considered to be "non-transitory machine-readable media." As used herein, the term "non-transitory" will be understood to exclude transitory signals but to include all forms of storage, including both volatile and non-volatile memories.

While the controller 200 is shown as including one of each described component, the various components may be duplicated in various embodiments. For example, the processor 202 may include multiple microprocessors that are configured to independently execute the methods described herein or are configured to perform steps or subroutines of the methods described herein such that the multiple processors cooperate to achieve the functionality described herein. Further, where the controller 200 is implemented in a cloud computing system, the various hardware components may belong to separate physical systems. For example, the processor 202 may include a first processor in a first server and a second processor in a second server.

Referring now to FIGS. 1, 2 and 3, in accordance with some embodiments, a system 10 for power management utilizes an instruction set provided to processor 202 that monitors all appliance 200 loads. Processor 202 may also include the instruction set that operates the appliance 200, accepting user inputs 220 from operator interface 240 and actuating or energizing the various components of appliance 200 be operatively coupled outputs 210 as required for normal operation. It should be understood that any appliance 200 or other device that operates with electrical power may be utilized in conjunction with the system 10 without departing from the scope of the invention.

In one non-limiting exemplary embodiment for purposes of illustration in this specification, appliance 200 may be a conventional stove 200, (or equivalently a cooktop and oven combination). Stove 200 may include multiple electrical loads, for example those of the four cooktop burners L1, L2, L3 and L4 as well as two oven heating elements L5 and L6. Other loads L may also be present, but for purposes of explication have been omitted from this example. Each of these component loads L1-L6 is operatively connected to an output 210 of controller 200 that actuates or energizes (i.e., provides electrical power to) the components. The actuation of loads is often accomplished by a controller 200 output 210 energizing a relay or other switch that connects electrical power to a load, for example a stove burner L1. Additionally and/or alternatively, an input signal 220 may be provided to controller 200 that provides an indication that an individual component is being actuated or alternatively requested. In either embodiment controller 200 is provided with information that a specific load L1-L6 is being energized.

As shown in FIG. 2 block diagram 300 and FIG. 3, once an appliance 200 load L1-L6 is activated, in this example by turning on a stove 200 burner L1, processor 202 calculates a total load Pt by adding the load ratings stored in memory 204, 206 of all component loads L1-L6 that are being activated at that time. In various embodiments the load rating provided for each component will be current loads measure in amperes, but any measure of circuit capacity may be used without departing from the scope of the invention. As best seen in FIG. 3, an exemplary appliance load data chart 400 may be provided in storage 204 to facilitate this calculation in processor 202. In some aspects and embodiments load data chart 400 may include a list of components 402 L1-LN that may be activated by appliance 200 along with an associated load rating 404 for each either in terms of current (amperes, A) or power (kW), and a maximum power load 412. Processor 202 may then be provided with instructions to simply add the activated or requested loads L together to arrive at a total load and then compare the total load Pt with a maximum load 420 listed for appliance 200.

In various aspects of this exemplary embodiment if the total load Pt exceeds the maximum load Pmax for appliance 200, controller 200 is instructed to adjust the power or current delivery to components of the device to maintain a total load Pt that is below the maximum load Pmax, as will be discussed further herein below. If, however, the total load Pt does not exceed the maximum allowed load Pmax, controller 200 simply activates the component that is requested. As readily seen, system 10 provides a reliable and cost-effective solution for power management that does not require costly additional hardware or complex software algorithms.

In accordance with some aspects of the disclosure, and referring again to FIGS. 2 and 3, data chart 400 may additionally include various characteristics associated with each load L of appliance 200 the enables processor 202 to discern how to manage energy consumption where the maximum load Pmax is exceeded by the requested load. As seen in table 400, each load L has associated therewith a pulse-width modulation column 406, a voltage scale column 408, and critical component column 410, and a power cycle column 412. When any of these characteristics are checked for a specific load Ln, processor 202 can ascertain how the requested component load is to be treated when its activation is requested but the resultant total load Pt exceeds the listed maximum load Pmax.

The pulse-width modulation column PWM indicates whether the associated component may be activated by using pulse-width modulation to reduce its current or power consumption. Similarly, the voltage scaling column Vscale indicates whether the associated component may be activated by using voltage scaling to reduce its current or power consumption. The "critical" column 410 indicates whether a specified component is critical or non-critical. When a load Ln is deemed critical, it may not be operated at a reduced power level by controller 200, such that other non-critical requested loads must be operated on reduced power to avoid a circuit overload.

Additionally, the "cycle" column indicates whether a specified component may be operated by cycling power on and off until the overall requested load Pt is below the maximum Pmax. In this situation, where several requested loads are capable of operating with cycled power, controller 200 may cycle outputs 210 to each of these loads for a predetermined time period to maintain their operation while keeping total power consumption for appliance 200 below Pmax. This feature is particularly useful in stove and oven appliance 200 applications, where an individual burner or heating element may be activated for a short time predetermined time period to maintain its heat output level, and then deactivated for a short time period while another element is energized.

While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A system for managing electrical power consumption of an appliance comprising:
    a processor and concomitant data memory, said processor having a plurality of inputs and outputs for receiving and providing electrical signals to a plurality of electrical components of said appliance;
    a data table stored in said memory listing a nominal power consumption for each of said plurality of electrical components of said appliance wherein said data table includes a plurality of characteristics associated with each of said components, said characteristics including pulse-width modulation capability, voltage scaling capability, voltage cycling capability, whether each of said components are critical to the operation of said appliance, and a maximum allowable power load for said appliance;
    said processor configured to;
    monitor said plurality of components to determine which of said components are being energized based upon the status of their respective inputs and outputs; and
    adjust the power provided to at least one of said components based upon a predetermined criteria.

2. The system of claim 1 wherein said processor is further configured to:
    add the total of all loads to provide a total requested power load; and
    reduce the electrical power provided to at least one component when the total requested power load exceeds the maximum allowable power load.

3. The system of claim 2 wherein said processor is further configured to reduce the electrical power provided to at least one component based upon said look-up table characteristics when the total requested power load exceeds the maximum allowable power load.

4. The system of claim 2 wherein said processor is further configured to reduce the electrical power provided to a specified component by providing pulse-width modulated power based upon said look-up table characteristics when the total requested power load exceeds the maximum allowable power load.

5. The system of claim 2 wherein said processor is further configured to reduce the electrical power provided to a specified component by provided scaled voltage power based upon said look-up table characteristics when the total requested power load exceeds the maximum allowable power load.

6. The system of claim 2 wherein said processor is further configured to reduce the electrical power provided to a specified component by providing cycled power based upon said look-up table characteristics when the total requested power load exceeds the maximum allowable power load.

7. The system of claim 6 wherein power is cycled on and off to said specified component for predetermined time periods.

8. The system of claim 2 wherein said processor is configured to reduce the electrical power provided to at least one component that is not designated as a critical component when the total requested power load exceeds the maximum allowable power load.

9. A method of managing electrical power supplied to an appliance having a plurality of electrically powered components comprising:
    providing a processor and concomitant data memory, said processor having a plurality of inputs and outputs for receiving and providing electrical signals to a plurality of electrical components of said appliance;
    providing a data table stored in said memory listing a nominal power consumption for each of said plurality of electrical components of said appliance;
    providing instructions to said processor configured to monitor said plurality of components to determine which of said components are being energized based upon the status of their respective inputs and outputs;
    providing said data table with a plurality of characteristics associated with each of said components, said characteristics including pulse-width modulation capability, voltage scaling capability, voltage cycling capability, whether each of said components are critical to the operation of said appliance, and a maximum allowable power load for said appliance; and
    adjusting the power provided to at least one of said components based upon a predetermined criteria.

10. The method of managing electrical power of claim 9 comprising:
    providing instructions to said processor to add the total of all loads to provide a total requested power load; and
    adjusting the electrical power provided to at least one component when the total requested power load exceeds the maximum allowable power load.

11. The method of managing electrical power of claim 9 comprising:
    providing instructions to said processor to reduce the electrical power provided to at least one component based upon said look-up table characteristics when the total requested power load exceeds the maximum allowable power load.

12. The method of managing electrical power of claim 9 comprising:
    providing instructions to said processor is to reduce the electrical power provided to a specified component by providing pulse-width modulated power based upon said look-up table characteristics when the total requested power load exceeds the maximum allowable power load.

13. The method of managing electrical power of claim 9 comprising:
    providing instructions to said processor to reduce the electrical power provided to a specified component by provided scaled voltage power based upon said look-up table characteristics when the total requested power load exceeds the maximum allowable power load.

14. The method of managing electrical power of claim 9 comprising:
    providing instructions to said processor to reduce the electrical power provided to a specified component by providing cycled power based upon said look-up table characteristics when the total requested power load exceeds the maximum allowable power load.

* * * * *